United States Patent [19]

Rollins et al.

[11] Patent Number: 4,617,161
[45] Date of Patent: Oct. 14, 1986

[54] METHOD OF MANUFACTURE FOR A DIALYZER HAVING IMPROVED SIDE PORTS

[75] Inventors: Richard A. Rollins, Mundelein; Thomas J. Sluga, McHenry; Henry Tobiasz, Arlington Heights, all of Ill.

[73] Assignee: Baxter Travenol Laboratories, Inc., Deerfield, Ill.

[21] Appl. No.: 529,467

[22] Filed: Sep. 6, 1983

[51] Int. Cl.⁴ .......................................... B22D 11/126
[52] U.S. Cl. ................................. 264/136; 210/321.3; 264/279
[58] Field of Search ............ 264/270, 311, 261, 209.5, 264/209.7, DIG. 33, 136, 279; 210/321.1, 321.2, 321.3; 29/419 R

[56] References Cited

U.S. PATENT DOCUMENTS

| | | | |
|---|---|---|---|
| 4,198,080 | 4/1980 | Carpenter | 210/321.3 |
| 4,227,295 | 10/1980 | Bodnar et al. | 210/321.3 |
| 4,238,340 | 12/1980 | Markley et al. | 210/321.3 |
| 4,283,284 | 8/1981 | Schnell | 210/321.3 |
| 4,389,363 | 6/1983 | Molthop | 210/321.3 X |
| 4,497,104 | 2/1985 | Fowles | 29/419 |

Primary Examiner—Frank Spear
Attorney, Agent, or Firm—Paul C. Flattery; Garrettson Ellis

[57] ABSTRACT

A hollow fiber separation device is made having a blow molded housing and at least one laterally extending side port which defines a seamless outer end portion having an annular outwardly extending seamless shoulder portion. Additionally, the side port may have first and second annular encircling channels, the first channel being proportioned to receive retention members from a mating connector that sealingly locks with the side port. The second annular channel is provided to stiffen the side port, which may be made of substantially semi-flexible plastic.

9 Claims, 4 Drawing Figures

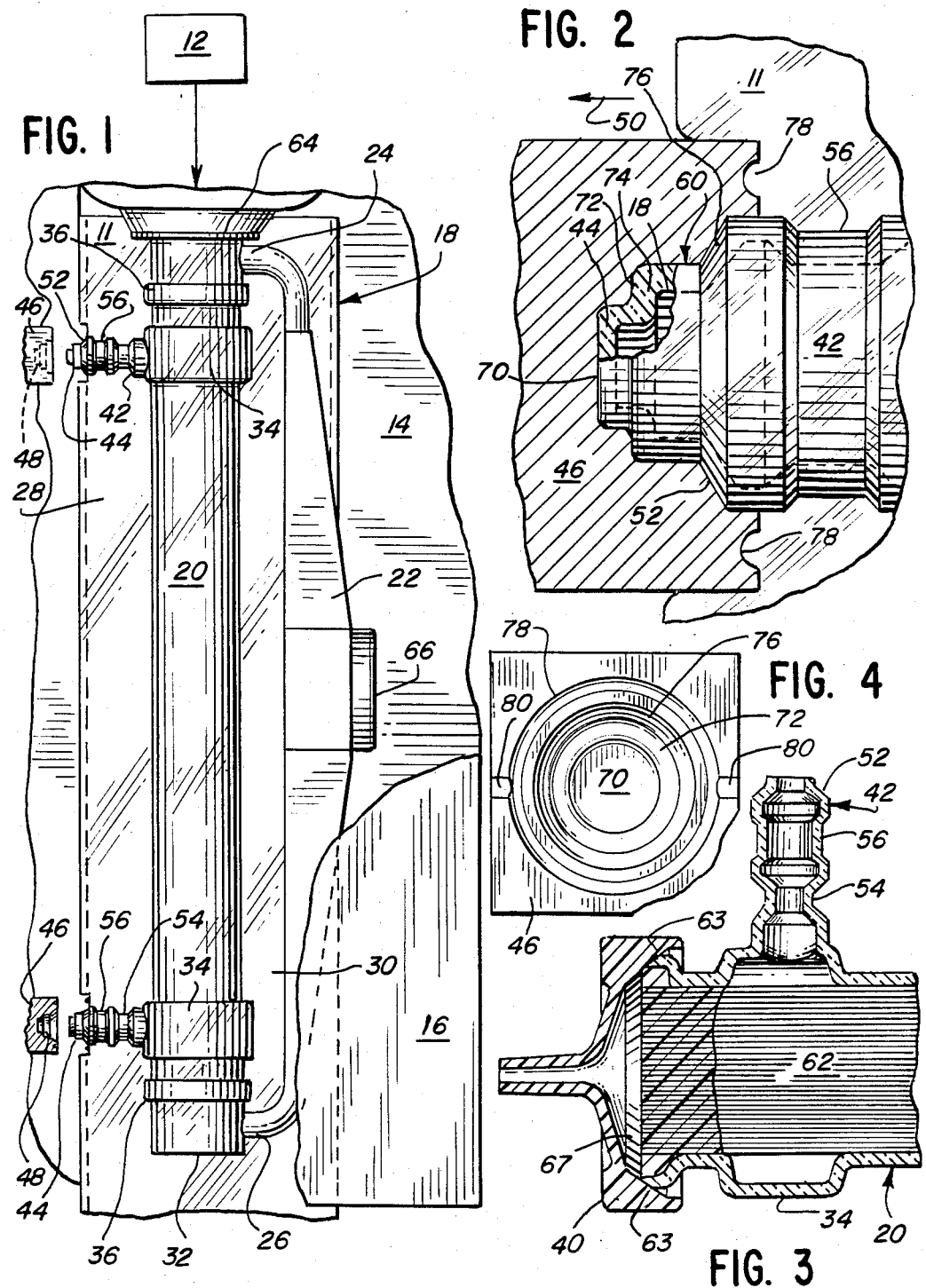

METHOD OF MANUFACTURE FOR A DIALYZER HAVING IMPROVED SIDE PORTS

TECHNICAL FIELD

Hollow fiber separation devices are commercially available from a number of sources and for a number of purposes. In the medical field, various designs of hollow fiber separation devices are available for use as dialyzers for blood, particularly the family of CF ® dialyzers sold by Travenol Laboratories, Inc. of Deerfield, Ill. Additionally, a hollow fiber separation device for the plasmapheresis of blood is commercially available.

Both dialysis and membrane plasmapheresis are expensive procedures. There is accordingly a need to provide effective cutting of the costs of the procedure without reduction of its effectiveness, convenience, and safety.

In Schnell U.S. Pat. No. 4,283,284 a hollow fiber dialyzer end seal system is disclosed. As is currently conventional, the casing of the hollow fiber dialyzer is made of injection molded plastic, including the side ports for the dialyzate solution to enter and exit the dialyzer.

In Carpenter U.S. Pat. No. 4,198,080 a telescoping-type connector is disclosed which constitutes an improvement on the standard "Hansen" type connector system, which is currently used in many commercial hollow fiber dialyzers to make connection between the dialysis solution delivery system and the dialysis side ports of the dialyzer. A typical Hansen connector, connecting with a dialyzer side port, is disclosed.

In Fowles et al. U.S. Pat. No. 4,497,104 entitled "SEPARATION DEVICE MANUFACTURE", a technological breakthrough is described in terms of cost reduction in the manufacture of hollow fiber separation devices. Basically, one or more tubular housing portions are formed, preferably by blow molding, in a single operation. The well known steps of addition of potting compound and centrifugation, for example as disclosed in Bodnar et al. U.S. Pat. No. 4,227,295, may then be performed for the manufacture of a potted diffusion device containing hollow fibers at a significantly reduced cost over prior art processes.

However, as one potential drawback, such blow molded housings may not always be absolutely rigid because of the low wall thicknesses imparted by the stretching action of blow molding, so that the housings have a certain amount of flexibility, although they remain fully self-supporting and shape retaining when unstressed. Thus they may sometimes be semiflexible. Particularly in the area of the side ports, the wall thickness can become quite low, so that difficulties may be encountered in adapting the side ports for connection with a Hansen type connector because of this semiflexible characteristic.

Furthermore, as is well known, a Hansen-type connector forms a primary seal with the use of an O-ring which is pressure-engaged against an annular shoulder of a typical side port of a dialyzer of the prior art. When made by a typical blow molding system, the side ports would exhibit a parting line along their length. This parting line could interfere with the security and quality of the seal formed in the Hansen connector or the like with its O-ring.

In accordance with this invention, a method for making a hollow fiber separation device is disclosed, in which the disadvantages of the prior art are overcome.

For purposes of this invention the tubular housing for the separation device is blow molded for reasons of economy. Nevertheless, in accordance with this invention, blow molded side ports may be provided with adequate stiffness and a seamless outer end, so that they can mate and seal with Hansen type connectors, for example, of generally conventional design such as that disclosed in the cited Carpenter, U.S. Pat. No. 4,198,080. Thus the advantages obtained from blow molding of the hollow fiber separation device housing can be applied to such separation devices, which may be used in conventional dialysis solution delivery systems or other "hardware" which is already in the possession of the user. Thus the cost improvement provided by this invention may be achieved without the corresponding disadvantage of requiring substantial replacement of equipment customarily used in dialysis or other processes.

DESCRIPTION OF THE INVENTION

In accordance with this invention a hollow fiber separation device may be made by a manufacturing method which includes the steps of blow molding an integral structure which comprises at least one tubular housing and molding at least one laterally extending, closed-end side port adjacent an end of the tubular housing. For dialysis, a pair of such closed-end side ports are typically molded adjacent the ends of the tubular housing.

In accordance with this invention, one forms, through the action of laterally advanceable and retractable die member means, a seamless outer end portion on the laterally extending port by laterally advancing the die member means against the end of the blow molded side port while the side port is in moldable condition (i.e., sufficiently heated to be in moldable, softened condition). By this process one forms, adjacent the end of the side port, an annular, outwardly extending, seamless shoulder portion. One thereafter laterally retracts the die member means to permit removal of the housing from the blow mold.

Generally conventional blow molding technology may be used for this process, the temperatures and molding conditions being readily determinable by those skilled in the art using commercially available blow molding machinery and dependent upon the particular plastic material being blow molded.

The plastic material out of which the housing may be formed (and its precursor parison) may be any appropriate plastic material suitable for blow molding, for example, glycol modified polyethylene terephthalate (PETG), polyethylene, polypropylene, or any other suitable materials.

The use of laterally advanceable and retractable die members in the process of this invention provides a seamless end to the side ports formed therein despite the fact that in typical blow molding operation a parting line or seam is inevitably formed along the line where the blow mold opens to release the molded product. The die member provides a seamless (i.e., without a parting line or pinch line) shoulder portion which, in turn, can be pressed against the sealing O-ring of the Hansen connector (i.e., the female connector of the system) for a good, reliable seal without leakage. The presence of the seam created by a parting line or pinch line of a blow mold will result in a seal of substantially less quality.

While laterally advanceable and retractable members have been used in injection molding processes, no example of the adaptation of such a system to a blow molding operation is known, nor are the improved results which result from such a system for making side ports obvious to those skilled in the art.

There is also formed into the side port a first annular encircling channel about the side port which is positioned inwardly from the outwardly extending shoulder portion. This first channel is for receiving the retention members, typically a circular array of balls, of the Hansen connector for retention of the side port in the Hansen connector in locked relation.

A second annular encircling channel may be formed into the side port at a position between the first annular channel and the outwardly extending annular shoulder portion. The depth of the second annular channel is less than the depth of the first annular encircling channel, and is preferably no more than one-half of its depth. This avoids an apparently locked configuration between the side port and the mating Hansen-type connector when the retention balls project into the second channel. The depth of the second channel is insufficient to cause the user to perceive an apparently locked configuration, since the balls can slide into and out of the second channel, causing the user to continue to advance the connector until the balls are able to enter into the first channel in properly locked configuration. The purpose of the second channel is to stiffen the side port so that, even though it is of low wall thickness, it is of adequate stiffness to effectively function as part of the connector system.

The method of this invention also preferably includes the steps of cutting open the outer end of the molded side port, after molding it, without cutting the annular, outwardly extending flange; inserting hollow fibers for diffusion into the housing; providing closed ends to the housing; spinning the housing about an axis between the housing ends; adding potting compound to the interior of the housing, whereby the potting compound migrates radially outwardly to the closed ends of the housing to encase the ends of the hollow fibers in potting compound; and curing the potting compound.

Thereafter, the method of this application preferably includes the steps of transversely cutting the ends of the tubular housing through the potting compound after curing to expose open bores of the hollow fibers, and applying flow manifold end cap members to the cut, tubular housing ends.

By this method, a hollow fiber separation device such as a dialyzer or a membrane plasmapheresis device may be made having reduced cost of manufacture, while at the same time exhibiting undiminished performance characteristics and convenience of use when compared with prior designs.

DESCRIPTION OF THE DRAWINGS

FIG. 1 is a fragmentary elevational view, taken partly schematically, of a hollow fiber separation device in the process of being blow molded.

FIG. 2 is a magnified fragmentary elevational view of a blow molded side port having its seamless outer end portion formed by a laterally advanceable and retractable die member, shown in section.

FIG. 3 is a fragmentary longitudinal sectional view of a portion of a hollow fiber separation device manufactured in accordance with this invention.

FIG. 4 is a plan view of a shaping die used in the blow molding process of FIGS. 1 and 2.

DESCRIPTION OF SPECIFIC EMBODIMENT

Referring to the drawings, FIG. 1 discloses a fragment of a conventional blow molding apparatus, for example, a Bekum Model III blow molding machine. A hot parison 11 of plastic is extruded from hot extruder 12, to be entrapped by the mold cavity defined between a pair of blow mold halves 14, 16, which are shown in broken-away form. As is conventional, the mold halves 14, 16 are moved to surround the parison, and the mold halves 14, 16 close around it.

Thereafter the parison is inflated with air or other gas, and, being sealed by mold halves 14, 16 about its periphery, the hot parison expands like a balloon to fill the desired shape of the mold cavity. By this process, integral structure 18 is formed, including a tubular housing 20 which is connected to elongated chamber portion 22 extending in elongated relation to the tubular housing 20 and communicating with the housing adjacent opposed ends 24, 26, in a manner similar to that disclosed in the previously cited Fowles et al. U.S. Pat. No. 4,497,104 (see, in particular, column 2, lines 40 to 52). As shown, housing 20 is surrounded by flattened "flash" material 28, 30, etc. which is flattened plastic material connected to the housing 20 and chamber portion 22 by only a thin web so it can be easily trimmed away.

As shown, housing 20 defines a molded closed end 32, as well as annular manifold enlargements 34, and annular channels 36 which are used for the adhesion of flow manifold end cap 40 to each end by solvent sealing, sonic sealing, or a similar technique.

In accordance with this invention, side ports 42 are formed, with their outer ends 44 being formed by laterally advanceable and retractable die members 46 which, as shown in FIG. 2, can be advanced or retracted by a mechanical, pneumatic, or hydraulic system into forming engagement with end 44 of side port 42, with end 44 of side port 42 projecting into and being shaped by the open cavity 48 of die 46. Thereafter, as blow mold halves 14, 16 are being pulled apart, each die member 46, one for each side port 42, can be moved into laterally retracted relation in the direction of arrow 50 (FIG. 2) to permit the completed integral structure 18 to drop out of the mold system.

Specifically, each die member 46 forms in end 44 of each side port 42 an outwardly extending annular, seamless shoulder portion 52. Such an annular shoulder portion 52 can extend into a conventional Hansen-type connector to seal against an O-ring positioned therein for sealing of the connection between them.

Die member 46 is shown in a plan view in FIG. 4 and a detailed side view in FIG. 2, and is shown to include an indentation having a central inner wall 70 which serves to define the shape of the outer end of side port 42.

Annular ledge 72 is defined circumferentially about inner wall 70 to define the corresponding annular, stepped portion 74 of side port 42.

Annular shoulder portion 52 of side port 42 may be defined by annular sloped section 76 within the indentation of die member 46. Annular trough 78 is provided for pressure relief of molten plastic, which can flow into trough 78 during the end-forming operation of side port 42 by die member 46.

Side relief slots 80 (FIG. 4) permit the flat parison material 28 to fit into die 46.

Each side port also defines a first annular channel 54 which serves as the retention channel into which the retention balls of a conventinal Hansen connector can project so that the Hansen connector enters into locking relation with side port 42, with the locking retaining relation being provided by the projection of the conventional retention balls into first annular channel 54 and the seal being provided by the impingement of annular shoulder 52 against an internal O-ring of the Hansen connector. A specific suitable female Hansen connector design for use in connecting with side ports 42 is as disclosed in the cited Carpenter U.S. Pat. No. 4,198,080 as the "outer telescoping member" (designated numeral 10, see, in particular, column 3, lines 6 to 11). Also the conventional Hansen connectors used on many commercially available hemodialysis machines may also be used to make the same connection.

Second annular channel 56 may, like first annular channel 54, be formed between blow mold havles 14, 16, since the seam formed by the parting line is not critical in these areas. The purpose of second annular channel 56 is to stiffen side port 42 so that, even though thin walled and tending to a semiflexible characteristic, side port 42 is stiffened by its shape to provide more effective sealing action. Second channel 56 can be seen to be no more than one-half the depth of first channel 54.

In the manufacture of the device of this invention, as shown in FIG. 1, integral structure 18 is formed from a heated parison 11 to define tubular housing 20 and the connected elongated chamber portion 22. After integral structure 18 has dropped out of the blow mold, and the flattened parison "flash" material 28, 30 is cut away, one may cut open the outer ends of molded side ports 42 by slicing along axis 60 as in FIG. 2 to provide the open side port of FIG. 3.

An aperture 66 is cut in the central portion of elongated chamber portion 22.

Thereafter, a bundle of hollow fibers 62 can be inserted into housing 20 in a manner similar to present prior art manufacturing techniques. Thereafter, one may provide a closed end to upper apertured disk portion 64 of housing 20, for example, by sealing a plastic strip or disk across the end or the like. The other end 32 of housing 20 is closed in its manufacture.

Thereafter, one may insert integral structure 18 into a centrifuge with elongated portion 22 facing up, in a manner analogous to the previously disclosed Bodnar et al. U.S. Pat. No. 4,227,295, (see in particular, column 4, lines 35 to 56) and one may insert a measured amount of liquid potting compound into aperture 66, either before or after initiation of centrifugation about the transverse central axis of the integral structure 18, with the effect that the potting compound migrates to ends 24, 26 radially outwardly to encase the ends of the hollow fibers of bundle 62 in a manner known to the prior art for sealing thereof.

After the potting compound has cured, one may transversely cut along annular enlargement 36 at each end to provide an edge 63 for sealing attachment for flow manifold end caps 40 at each end of housing 20, for the completed dialyzer in a manner generally known to the prior art, such as ultrasonic sealing.

Accordingly, the dialyzer or other hollow fiber separation device of this invention may be made with significantly decreased cost through the use of a blow molding process for manufacture of housing 20, plus an integrally attached, elongated chamber portion 22 which is used in the later potting step. The side ports 42 which are naturally thin and sometimes tending to be semiflexible, because they are made thin by the blow molding process, can be stiffened by the presence of second annular channel 56. The outer ends of side ports 42 are formed by this invention to be seamless so that the resulting shoulder portion 52 provides good sealing in a Hansen or other type connector against an O-ring of the other part of the connector. The first annular encircling channel 54 is also formed for receipt of retention members when connected with a Hansen or other telescoping connector.

The above has been offered for illustrative purposes only, and is not intended to limit the scope of the invention of this application, which is as defined in the claims below.

That which is claimed is:

1. In a method for making a hollow fiber separation device, including the steps of: blow molding an integral structure which comprises at least one tubular housing portion and molding at least one laterally extending, closed-end side port adjacent an end of the tubular housing, the improvement comprising, in combination: the step of forming through the action of laterally advanceable and retractable die member means a seamless outer end portion on said laterally extending port by laterally advancing said die member means against the end of the blow molded side port while said side port is in moldable condition, to form adjacent the end of said side port an annular, outwardly extending seamless shoulder portion, and thereafter laterally retracting said die member means to permit removal of the housing from the blow mold.

2. The method of claim 1 including the steps of cutting open the outer end of said molded side port without cutting said annular, outwardly extending shoulder portion; inserting hollow fibers for diffusion into said housing; providing closed ends to said housing; spinning said housing about an axis between the housing ends; adding potting compound to the interior of said housing, whereby the potting compound migrates radially outwardly to the closed ends of the housing to encase the ends of the hollow fibers in potting compound; and curing the potting compound.

3. The method of claim 2 including the steps of transversely cutting the ends of the tubular housing through the potting compound after curing to expose open bores of the hollow fibers, and applying flow manifold end cap members to the cut, tubular housing ends.

4. The method of claim 1 in which there is formed into said side port a first annular encircling channel about said side port positioned inwardly from said outwardly extending shoulder portion.

5. The method of claim 4 in which a second annular encircling channel is formed into said side port at a position between said first annular channel and the outwardly extending annular shoulder portion, the depth of said second annular channel being less than the depth of the first annular encircling channel.

6. In a method for making a hollow fiber separation device, including the steps of: blow molding an integral structure which comprises at least one tubular housing portion and molding laterally extending, closed-end side ports adjacent to the ends of the tubular housing portion, the improvement comprising, in combination: the step of forming, through the action of laterally advanceable and retractable die members, a seamless outer end portion on each laterally advancing port by laterally advancing said die members against the ends of the blow molded side ports while said side ports are in moldable condition to form adjacent each end of each side port an annular, outwardly extending seamless shoulder portion, and thereafter laterally retracting said die member means to permit removal of the housing portion from the blow mold.

7. The method of claim 6 in which there is formed a first annular encircling channel about each of said side ports positioned inwardly from said outwardly extending shoulder portion, and there is also formed a second annular encircling channel in each of said side ports at a position between the first annular channel and the outwardly extending annular shoulder portion, the depth of said second annular channel being no more than one-half the depth of the first annular encircling channel.

8. The method of claim 7 in which an elongated chamber portion extending in elongated relation to the tubular housing portion and communicating with the housing portion adjacent to opposed ends thereof is blow molded in integral manner with said tubular housing portion.

9. The method of claim 8 including the steps of cutting open the outer ends of said molded side ports without cutting said annular, outwardly extending shoulder portion; inserting hollow fibers for diffusion into said housing portion; providing closed ends to said housing portion; spinning said housing portion about an axis between said ends; providing an aperture in a central area of said elongated chamber portion; adding potting compound to the interior of said housing portion through the aperture, whereby the potting compound migrates radially outwardly through the elongated chamber to the closed ends of the housing portion to encase the ends of the hollow fibers in potting compound; curing the potting compound; transversely cutting the ends of the tubular housing portion through the potting compound after curing to expose open bores of the hollow fibers; and applying flow manifold end cap members to the cut, tubular housing ends.

* * * * *